United States Patent
Hayes

(10) Patent No.: US 7,949,700 B2
(45) Date of Patent: May 24, 2011

(54) MODAL INTERVAL PROCESSOR

(75) Inventor: Nathan T. Hayes, Minneapolis, MN (US)

(73) Assignee: Sunfish Studio, LLC, Minneapolis, MN (US)

(*) Notice: Subject to any disclaimer, the term of this patent is extended or adjusted under 35 U.S.C. 154(b) by 1191 days.

(21) Appl. No.: 11/569,262

(22) PCT Filed: Apr. 5, 2006

(86) PCT No.: PCT/US2006/012547
§ 371 (c)(1),
(2), (4) Date: Nov. 17, 2006

(87) PCT Pub. No.: WO2006/107996
PCT Pub. Date: Oct. 12, 2006

(65) Prior Publication Data
US 2008/0012599 A1    Jan. 17, 2008

Related U.S. Application Data

(60) Provisional application No. 60/668,539, filed on Apr. 5, 2005, provisional application No. 60/722,107, filed on Sep. 30, 2005, provisional application No. 60/722,103, filed on Sep. 30, 2005, provisional application No. 60/723,216, filed on Oct. 3, 2005, provisional application No. 60/723,059, filed on Oct. 3, 2005, provisional application No. 60/723,249, filed on Oct. 3, 2005.

(51) Int. Cl.
*G06F 7/38* (2006.01)

(52) U.S. Cl. ........................................ 708/490

(58) Field of Classification Search .......... 708/200–209, 708/495, 490–492
See application file for complete search history.

(56) References Cited

U.S. PATENT DOCUMENTS

| | | | | |
|---|---|---|---|---|
| 5,010,508 A * | 4/1991 | Sit et al. | ........................ | 708/505 |
| 5,027,308 A * | 6/1991 | Sit et al. | ........................ | 708/505 |
| 5,598,362 A * | 1/1997 | Adelman et al. | .............. | 708/603 |
| 5,606,520 A * | 2/1997 | Gove et al. | ..................... | 708/491 |
| 5,761,521 A * | 6/1998 | Chilinski et al. | .............. | 708/212 |
| 6,351,760 B1 * | 2/2002 | Shankar et al. | ............... | 708/654 |
| 6,658,443 B1 * | 12/2003 | Walster | ........................ | 708/495 |
| 7,107,302 B1 * | 9/2006 | Fridman et al. | ............... | 708/319 |
| 7,640,285 B1 * | 12/2009 | Oberman et al. | ............. | 708/523 |

OTHER PUBLICATIONS

Bernadette et al., "From Interval Computations to Modal Mathematics: Applications and Computational Complexity", 1998, IEEE, pp. 7-11.*

Williams, Gerald Shawn, Processor Support for Interval Arithmetic; May 1998; Lehigh University, pp. 1-82.

Supplementary European Search Report under Art. 153(7) and the European search opinion for EPC Appl. No. 06740509.2, Sep. 29, 2009.

Gardeñes et al. Modal Intervals, Reliable Computing 7:77-111, 2001 Kluwer Academic Publishers, Printed in the Netherlands.

* cited by examiner

*Primary Examiner* — Chat C Do

(74) *Attorney, Agent, or Firm* — Nawrocki, Rooney & Sivertson, P.A.

(57) ABSTRACT

A logic circuit computes various modal interval (MI) arithmetic values using a plurality of arithmetic function units (AFUs), each dedicated to compute a specific MI arithmetic operation. The AFUs receive first and second MI operand values each encoded in first and second operand signals. Each AFU provides a MI result value encoded in a result signal to a multiplexer. The multiplexer receives a selector signal specifying the MI arithmetic operation desired, and provides to a result register, an output signal encoding the MI result value specified by the selector signal. The result register stores the MI result value.

15 Claims, 3 Drawing Sheets

MODAL INTERVAL PROCESSOR

This is an international application filed under 35 U.S.C. §363 claiming priority under 35 U.S.C. §119(e), of: provisional application Ser. No. 60/668,539 entitled "Interval Microprocessor (Modal Intervals)," having a filing date of Apr. 5, 2005; provisional application Ser. Nos. 60/723,216, entitled "System and Method for Representing Modal Intervals within a Computer System," 60/723,059, entitled "System and Method for Performing a Mask Driven Modal Interval Multiplication Operation," and 60/723,249, entitled "System and Method for Performing a Mask Driven Modal Interval Division Operation," each having a filing date of Oct. 3, 2005; and, 60/722,107 entitled "System and Method of Computing Narrow Bounds on Orthographic and Stereo Graphic Spherical Projections Using Interval Analysis," and 60/722,103 entitled "System and Method of Computing Narrow Bounds on Bezier Functions Using Modal Intervals," each filed Sep. 30, 2005, each of the priority provisional patent applications cited being incorporated herein by reference in its entirety.

BACKGROUND OF THE INVENTION

The present invention relates to the field of interval arithmetic processing circuitry and in particular relates to modal interval (MI) processors capable of performing reliable computations on MI data types.

Interval processors in the prior art are characterized by the exclusive implementation of set-theoretical interval arithmetic, the so-called "classical" interval arithmetic of Ramon Moore. The design of such processors is motivated by the fact that interval operations are more complex than traditional floating-point calculations.

There is a significant problem that none of the existing interval processor designs have considered. The problem is fundamental in the sense that it resides in the system of interval arithmetic itself. In 2001, a series of papers published by Miguel Sainz introduced a new type of mathematical interval known as "modal intervals." These papers render obsolete all prior work in the field of interval processor design by redefining the fundamental notion of an interval. In one view, modal intervals are a generalization of set-theoretical intervals. Analysis of modal intervals shows that existing computing hardware based on set-theoretical interval functions is fundamentally flawed and lacking in completeness and correctness.

The following references are relevant to the understanding of modal intervals, modal interval mathematics, and the invention.
Set-Theoretical Intervals
Jaulin, Luc, et. al., "Applied Interval Analysis," Springer Verlag, 2001.
Hansen, Eldon and William Walster, "Global Optimization Using Interval Analysis," $2^{nd}$ ed., Marcel Dekker, 2004.
Moore, Ramon, "Interval Analysis," Prentice Hall, 1966.
Modal Intervals
Sainz, Miguel, et. al., "Ground Construction of Modal Intervals," University of Girona, 2001.
Sainz, Miguel, et. al., "Interpretability and Optimality of Rational Functions," University of Girona, 2001.
*Sainz, Miguel, et. al., "Modal Intervals," Reliable Computing 7.2, 2001, pp. 77.
Sainz, Miguel, et. al., "Semantic and Rational Extensions of Real Continuous Functions," University of Girona, 2001.
The web site having the URL of www.mice.udg.es/cgi-bin/mi_fstar.cgi?t=1&h=1 at this time provides a web-based modal intervals calculator. The *Sainz article from Reliable Computing 7.2 is incorporated by reference into this specification.

BRIEF DESCRIPTION OF THE INVENTION

The present invention comprises an improvement in an interval arithmetic processor for performing calculations on a plurality of data formats, each representing a compact set of real numbers and a modal quantifier, that is, a modal interval. A means for converting the plurality of data formats to and from a file format wherein the file format has a modal interval domain greater than any one of the plurality of data formats is connected to a modal interval bus. A register file containing a plurality of hardware registers configured to store modal interval information in the file format is coupled to the modal interval bus; a modal interval processing unit used to perform modal interval operations in file format on the modal interval information is also connected to the modal interval bus. By reason of this combination of elements, all data formats are converted to a file format which has a greater dynamic range than any of the modal interval quantities which the modal interval processor may be called upon to manipulate, thereby allowing mixed mode modal interval computations because the file format is able to include all supported data formats after their conversion.

The present invention also includes a facility for detecting, indicating and handling exceptional conditions during any computational operation. A specific response to each exceptional condition which is capable of identification is performed each and every time an exceptional condition occurs during computation. In the event of each exceptional condition, a set of user-selectable switches determines which specific response will be generated. A response may include the generation of an interrupt to stop processing, or to continue computation by inserting, at that point in the computation, a specific response which is determined by the precise circumstances of the exceptional condition which has occurred. In all cases, indication that an exceptional condition has occurred is not lost and remains stored within the modal interval processor throughout the entire computation so that the user has the option of being aware of the precise nature of the exceptional condition and then taking appropriate measures in software.

The modal interval processor may handle both signed zeros and signed infinity and thereby be able to include within its capacity the ability to retain symmetry in modal interval computations involving reciprocals of zero or infinity. The modal interval processor may also handle empty modal intervals and provide a facility to silently propagate them through a computation. Furthermore, the present invention includes a means for rounding the modal interval information according to the "outward rounding" required by modal interval operations.

One form of the invention comprises a logic circuit for computing first and second modal interval (MI) result values of first and second different MI mathematical functions responsive to respectively, first and second values of a selector signal. This computing function is based on at least one MI operand value encoded in an operand signal. Each MI value comprises, as is known in the art, first and second multi-bit set theoretical numbers (STN) defining first and second endpoints of a range of real numbers. Each MI operand and result value further encodes one of a universal and an existential quantification value.

The quantification value can be represented by either of two notations. In the explicit notation, each MI value includes a quantification or quantifier bit specifying either a universal or an existential quantification value. In this case, the first presented of the two STN values must have a signed value smaller than or equal to the second. In the implicit convention, the positional relationship of the smaller and larger STNs defines the quantification value. Thus, for the implicit notation, when the first STN is greater than or equal to the second STN of the MI value, then the MI may have the universal quantification value. All other MIs have the existential quantification value.

At least first and second arithmetic functional units (AFUs) are each connected to receive the operand signal. Each AFU performs an arithmetic operation using as the arguments therefor, one or two MI operand values encoded in the operand signal. The AFUs each respectively provide the first and second MI result values in first and second result signals;

A multiplexer has a selector input receiving the selector signal, and a multibit output port for providing an output signal encoding a MI result value. The multiplexer further has at least first and second multi-bit input ports that are connected to respectively receive the first and second result signal provided as the operand signals of the first and second AFUs. Each input port is associated with a single selector signal value. The multiplexer supplies, encoded in an output signal provided by the output port, the MI result value provided at the input port thereof associated with the current selector signal value.

A result register is connected to receive the output signal provided by the multiplexer output port, and stores each MI result value encoded in the output signal.

DESCRIPTION OF THE PREFERRED EMBODIMENTS

Figure 1:
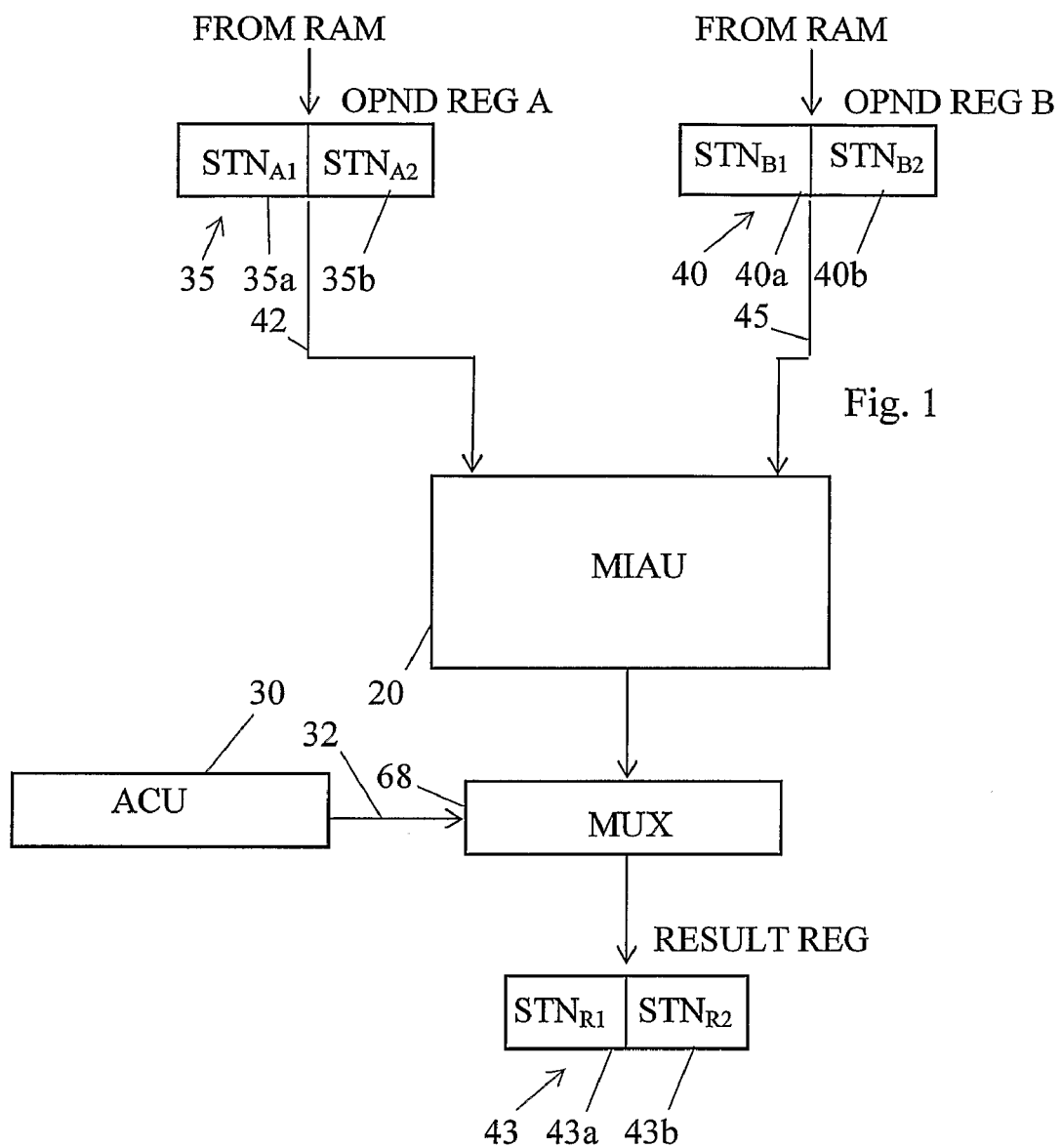
FIG. 1 is a block diagram of a logic circuit for computing a plurality of MI mathematical functions.

In order to understand the system and method of the present invention, consider first the deficiency of set-theoretical intervals and the motivation for modal intervals. A set-theoretical interval is defined entirely as a compact set of real numbers. For example, the set-theoretical interval [2,7] represents all real numbers x such that $2 \leq x \leq 7$. Classical interval arithmetic defines interval relations and interval operations purely in set-theoretical terms. But this narrow definition of an interval has its problems.

Consider the simple example A+X=B. As an example, suppose A, X and B are given by the equation of set-theoretical intervals [3,7]+X=[1,2], X being the unknown variable. In order to solve for X, the equation must be rearranged as X=[1,2]−[3,7], giving the result X=[−6,−1]. Then by substitution, [3,7]+[−6,−1]≠[1,2]. The original equation is no longer true. This is one example of the deficiency of set-theoretical interval arithmetic, but the literature is full of others. In general, such deficiencies apply equally to set-theoretical interval operators and relations.

In contrast to a purely set-theoretical interval, a modal interval is comprised of two basic components or elements. The first of these two components is a set-theoretical interval. Due to this fact, the relation of modal intervals to set-theoretical intervals can clearly be seen as a true superset. That is, a modal interval possesses all the characteristics of a set-theoretical interval, and more. The second ingredient of a modal interval is a modal quantification value, which is a binary indicator of "existential" or "universal" modality. In the same way that every real number can be represented in terms of sign and magnitude, so too can every modal interval be represented in terms of a quantifier and a set-theoretical interval. For this reason, a modal interval is by nature a higher-dimensional construct of a set-theoretical interval, much like a complex number is a higher-dimensional construct of a real number. As explained in the Brief Description above, the quantification value may be defined either by the explicit or the implicit notation.

Because the very nature of a modal interval carries with it more information than a set-theoretical interval, modal interval operators and relations are more complex than the classical set-theoretical interval operators and relations. As a consequence, existing interval processor designs are inadequate and unsuitable for use in modal interval computations. Even relatively simple hardware designs to compare two set-theoretical intervals for intersection can not compute correct results for modal intervals. Most notably, existing interval processor designs have no facility to consider modal quantifiers, a crucial element that will always be lacking in any design based purely on set-theoretical intervals.

Consider next the data formats which the modal interval processor must accommodate. There are many ways to represent modal intervals within a computer. Regardless of the actual binary data format, some basic requirements must be met. At the very least, the data format must accommodate the representation of a set-theoretical interval and a modal quantifier. Backwards compatibility with classical intervals can be easily accommodated from the user's perspective by simply providing an arbitrary but consistent default quantifier for each set-theoretical interval sent to the modal interval processor. For this reason, the modal interval processor does not need any explicit facility to promote a purely set-theoretical interval into a modal interval.

Consider at last the plight of those performing calculations using modern interval mathematics. Such users experience poor performance of both set-theoretical and modal interval computations on general-purpose hardware lacking native support for any type of interval computation, let alone modal interval computations. The web site entitled "Modal Intervals Calculator" and currently having a URL of http://mice.udg.es/cgi-bin/mi_fstar.cgi?t=1&h=1 implements MI calculations in software. This web site imposes a 60 second time limit on requested calculations.

Before the introduction of floating-point processors such as the Intel 8087 in 1980, only software emulations allowed floating-point calculations. This is due to the fact that the arithmetic logic unit of most central processing units only supported integer data formats and integer instructions. As a consequence, software was required to break floating-point data formats down into binary representations that could be manipulated within integer hardware registers in order to compute correct floating-point results. This resulted in slow computations and a complicated programming interface for software developers. Indeed, performing a simple floating-point arithmetic operation, such as multiplication, could require dozens of processor instructions and multiple branch conditions.

Such is the case for modern interval practitioners, except the situation is even worse. Most modern interval computations are still performed in software due to the lack of native support for interval data types and interval instructions on all major brand names of general-purpose computer chip manufacturers, see the "Modal Intervals Calculator" web site above. Many software emulation libraries for set-theoretical interval computations exist, and most of them use the IEEE 754 floating-point representation for numbers to specify the endpoints of a set-theoretical interval. To perform interval operations, software routines must execute a series of floating-point operations on the endpoints of the interval. The multiplication of two set-theoretical intervals, for example, requires the execution of a series of complicated branch conditions based on the signs of the four STN values which represent the two set-theoretical intervals. This problem is exacerbated when multiplying two modal intervals, as the number of possible branch conditions doubles in order to properly account for the complexity introduced by the modal quantifiers of each modal interval.

But in all cases, the worst aspect of performing interval computations in software is in regards to directed rounding. Both set-theoretical interval computations and modal interval computations require the notion of "outward rounding." For example, on some hypothetical computer that supports only two decimal digits of precision, the interval [1.3998,1.7912] should be rounded to [1.39,1.80], that is, the lower interval bound is rounded towards negative infinity and the upper interval bound is rounded towards positive infinity. On all modern IEEE 754 compliant processors, this directed rounding requires changing the rounding mode of the floating-point processor.

Most modern floating-point processors implement a deep, pipelined architecture; and changing the rounding mode of the processor can often force the pipeline to be flushed. Software emulation of interval computations frequently requires switching the rounding mode in order to perform only one or two floating-point computations before restoring to the previous rounding mode. This results in processor stalls and a staggering loss of performance. That is, the time expended in handling the directed rounding operations in software emulation of interval computations is often much worse than the simple overhead of extra processor instructions or branch conditions. Researchers have investigated the use of multimedia hardware registers found on popular desktop processors which support Single Instruction Multiple Data (SIMD) operations on floating-point numbers. Even in these cases directed rounding proves to be hugely detrimental.

As a result, well-known vector arithmetic hardware circuits provide no solution or benefit to software implementations of set-theoretical or MI computations.

So far, several points have been made. First, the motivation for the modal interval processor is based on the deficiency of set-theoretical intervals and therefore the deficiency of interval processors based on a purely set-theoretical implementation. Second, the data formats which the modal interval processor is to perform computations on must be able to represent a modal interval, which is comprised of a set-theoretical interval and a quantifier. Third, the modal interval processor provides a simplified programming model to users while at the same time eliminating the performance penalties and overhead of software emulation, the most significant performance penalty in this case being a consequence of the directed rounding which is required by interval computations.

The purpose of a logic circuit comprising a modal interval processor is to perform calculations on a plurality of data formats, each representing a compact set of real numbers and a modal quantifier, that is, a modal interval. As a consequence, the modal interval processor is comprised of three major constituent parts. First, a means for converting the plurality of data formats to and from a file format wherein the file format has a modal interval domain greater than any one of the plurality of data formats is connected to a modal interval bus. Second, a register file containing a plurality of hardware registers configured to store modal interval information in the file format is coupled to the modal interval bus. Third, a modal interval processing unit (MIPU) used to perform modal interval operations in file format on the modal interval information is also connected to the modal interval bus. By reason of this combination of elements, all data formats are converted to a file format having a greater dynamic range than any of the modal interval quantities which the modal interval processor may be called upon to manipulate, thereby allowing mixed mode modal interval computations because the file format is able to include all supported data formats after their conversion.

The preferred embodiment of a modal interval processor unit (MIPU) is a high performance processor logic fabricated as an integrated circuit. The circuit may be a separate package in the form of a coprocessor, or it may be an integral part of a more general central processing unit, sharing the same silicon as the core of the central processing unit. Due to recent advances in field-programmable gate array (FPGA) technology, the circuit may even be software microcode to be flashed into a silicon chip. In such a situation, the software acquires all of the characteristics of hardware, in that it has permanent physical existence.

One embodiment of the present invention stores a MI as a quantification value along with two set-theoretical numbers (STNs) defining endpoints. Each STN may comprise a scaled integer, a fixed-point fraction, or the ratio of two integers. Another embodiment of the present invention may use the well-known IEEE 754 convention to define each STN endpoint of a MI. The quantification value may be explicit, with a dedicated bit position in the storage element or implicit, with the value defined by the order in which the STNs are stored in the first and second positions of the storage element. This is explained above.

The functional attributes of the MIPU provide the most important features of the modal interval processor, namely the processing of modal interval information stored in file format within the plurality of hardware registers. The preferred embodiment provides a structure for implementing the four fundamental modal interval arithmetic operators +, −, ×and ÷; the fundamental modal interval relations <, ≦, ≧, >, ⊂, ⊃, = and ≠; the lattice operators min, max, ∧ (meet), and $\overline{\vee(\text{join})}$; and the modal interval dual operator. Additional processor instructions, including transcendental modal interval operators such as sqrt, ln, exp, sin, cos, and tan, may also be provided.

In one preferred embodiment, the modal interval processor uses a file format wherein the modal interval information is represented by two floating-point numbers, referred to as set theoretical numbers (STNs) and an implicitly specified quantifier value. In this case, circuits for floating-point arithmetic form the building blocks of the MIPU, which in turn provide a foundation for the use of polynomial approximation and CORDIC methods to evaluate the endpoints of transcendental and trigonometric modal interval functions.

Due to the dual nature of modal intervals, the inner and outer rounding modes required by modal interval calculations can in practice be implemented by providing only a single rounding mode. For example, if only outward rounding is implemented in hardware circuits, outward rounding performed on the dual of a modal interval can provide the correct inward rounding of the original modal interval. This allows the circuit design of the MIPU to be simplified and highly optimized, as outward rounding can be hard-wired into the functional design of the circuit, thereby avoiding the need to support or switch between multiple rounding modes.

Such a preferred embodiment may use a plurality of hard-wired floating-point circuits to process endpoints of a modal interval. In this case, some of the floating-point circuits are hard-wired to round towards negative infinity while the others are hard-wired to round towards positive infinity.

In the case where transistor count is at a premium, a preferred embodiment will support only a single hard-wired floating-point circuit, and may use the usual tricks to evaluate floating-point calculations rounded in the opposite direction. For example, if the floating-point circuit is hard-wired to round towards positive infinity, then evaluating $z=-((-x)-y)$ will produce the floating-point value z exactly as if the expression $z=x+y$ had been evaluated in a floating-point circuit which had been hard-wired to round towards negative infinity.

For all these reasons, it is the case that the MIPU under no circumstance ever must support the dynamic switching of a rounding mode, thereby providing opportunities for highly optimized circuits and even pipelined designs.

The modal interval processor may handle both signed zeros and signed infinity and thereby be able to include within its capacity the ability to retain symmetry in modal interval computations involving reciprocals of zero or infinity. The modal interval processor may also handle empty modal intervals and provide a facility to silently propagate them through a computation.

As the modal interval processor performs calculations on the modal interval information stored within the hardware registers, a remaining functional attribute of the modal interval processor is to detect, indicate and handle exceptional conditions during any computational operation. A specific response to each exceptional condition which is capable of identification is performed each and every time an exceptional condition occurs during computation.

In the event of each exceptional condition, a set of user-selectable switches determines which specific response will be generated. A response may include the generation of an interrupt to stop processing, or to continue computation by inserting, at that point in the computation, a specific response which is determined by the precise circumstances of the exceptional condition which has occurred. The precise nature of exceptional conditions which can be identified depends on the particular embodiment of the invention. For example, an embodiment that uses a file format wherein the modal interval information is represented by two floating-point numbers and an implicit quantifier value, the usual set of exceptional conditions as specified by IEEE 754 can be detected.

Regardless of the exceptional conditions that may arise due to such specific embodiments of the invention, the modal interval processor always detects exceptional conditions arising from any modal interval operation that operates outside the valid domain of the operation, such as taking the square root of a modal interval which contains negative numbers.

In this case, depending on the user-selectable switches, the modal interval processor may generate an interrupt to stop processing, or it may return an empty modal interval as the result of the exceptional condition. In all cases, indication that an exceptional condition has occurred is not lost and remains stored within the modal interval processor throughout the entire computation so that the user has the option of being aware of the precise nature of the exceptional condition and then taking appropriate measures in software.

Thus, the present invention introduces an improvement to a purely set-theoretical interval processor adding the capability to reliably process modal intervals. The reliability of computations is facilitated by performing all calculations at a dynamic range that is greater than any of the data formats which the modal interval processor will be called upon to process; additional reliability of computations is facilitated by a robust mechanism for handling each exceptional condition which is capable of identification. Most importantly, by combination of all the described parts, the modal interval processor provides a simple, elegant and computationally efficient programming interface to users who currently suffer the performance of modal interval computations on general-purpose hardware which lacks native support for any type of interval computation, let alone modal interval computation.

Turning next to FIGS. 1-4, which show all MIs therein with the implicit convention or notation for the quantification value. The explicit and implicit notations are completely equivalent.

FIG. 1 shows first and second operand registers 35 and 40 having respectively a $STN_{A1}$ portion 35a and $STN_{A2}$ portion 35b, and a $STN_{B1}$ portion 40a and $STN_{B2}$ portion 40b. Operand registers 35 and 40 provide operand signals on paths 42 and 45 respectively.

A MI arithmetic unit (MIAU) 20 receives the two operand signals from the operand registers 35 and 40. The MIAU 20 performs arithmetic operations on the MI operand(s) encoded in the signals of paths 42 and 45.

A multiplexer (MUX) 68 receives the output of MIAU 20 in a plurality of result signals from various arithmetic functional units (AFUs) within MAIU 20. A selector signal on a selector signal path 32 from arithmetic control unit (APU) 30 is applied to multiplexer 68 causing multiplexer 68 to select the result signal from one of the AFUs within MAIU 20, which signal is transmitted to STN portions 43a and 43b of a result register 43 in a result signal. Of course, each of the operand registers 35 and 40 and the result register all record an MI value having the two STN values shown as well as in this case a quantifier value.

Figure 2:
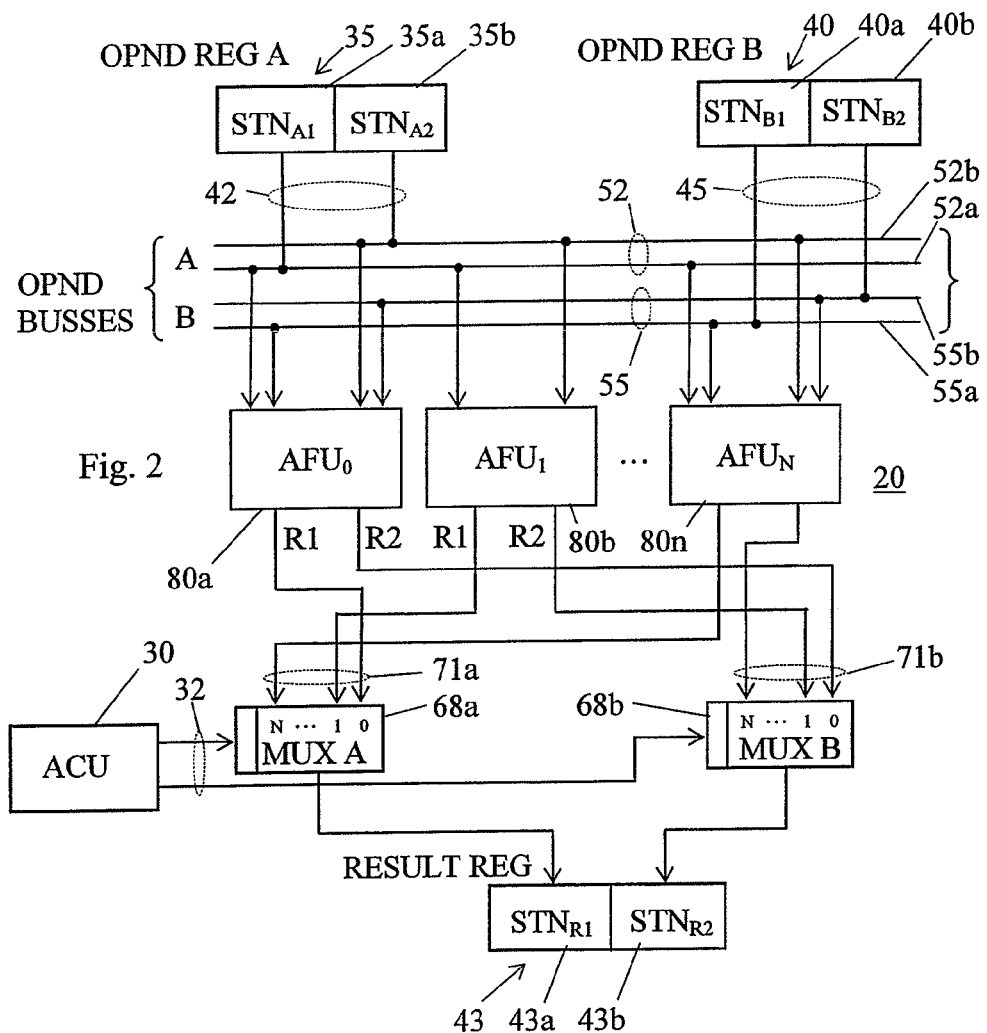
FIG. 2 shows a detailed block diagram of the logic diagram.

FIG. 2 shows the diagram of FIG. 1 in more detail. The values in the operand registers are applied to operand busses 52 and 55, which carry on individual STN paths 52a, 52b and 55a, 55b, the $STN_1$ and $STN_2$ values recorded in portions of operand registers A and B 35 and 40 respectively. Busses 52 and 55 distribute the individual $STN_{A1}$, $STN_{A2}$, $STN_{B1}$, and $STN_{B2}$ values to the various AFU elements 80a, 80b, and through 80n respectively. Some of the arithmetic functions computed may receive only a single operand. $AFU_1$ 80b is an example of such a unary arithmetic function, receiving only the $STN_{A1}$ and $STN_{A2}$ values.

$AFU_0$ -$AFU_N$ 80a-80n receive operand signals on busses 52 and 55. Each of the $AFU_0$ -$AFU_N$ 80a through 80n compute the assigned arithmetic function and supplies the result of that computation encoded in result signals for each of the STN result values R1 and R2 in the computed MI. Of course, the relative signed magnitudes encoded in the R1 and R2 values determine the quantification value of the MI provided by the particular AFU 80a, etc.

Multiplexer 68 comprises two separate multiplexer sections A and B, designated 68a and 68b, comprising multi-bit input ports 71a and 71b, respectively, each multiplexer section handling one of the two STN values R1 and R2. The R1 value from $AFU_0$ 80a is applied to port 0 input port 71a of section A 68a, the R2 value from $AFU_0$ 80a is applied to port 0 input port 71b of section B 68b, etc. ACU 30 provides a selector signal on path 32 that allows only the signal applied to a single one of the ports of each multiplexer section 68a and 68b to pass through to result register 43. For example, if the selector signal value is 0, then both input ports 0 of multiplexer sections 68a and 68b are activated to transmit the R1 and R2 values to result register 43.

Figure 3:
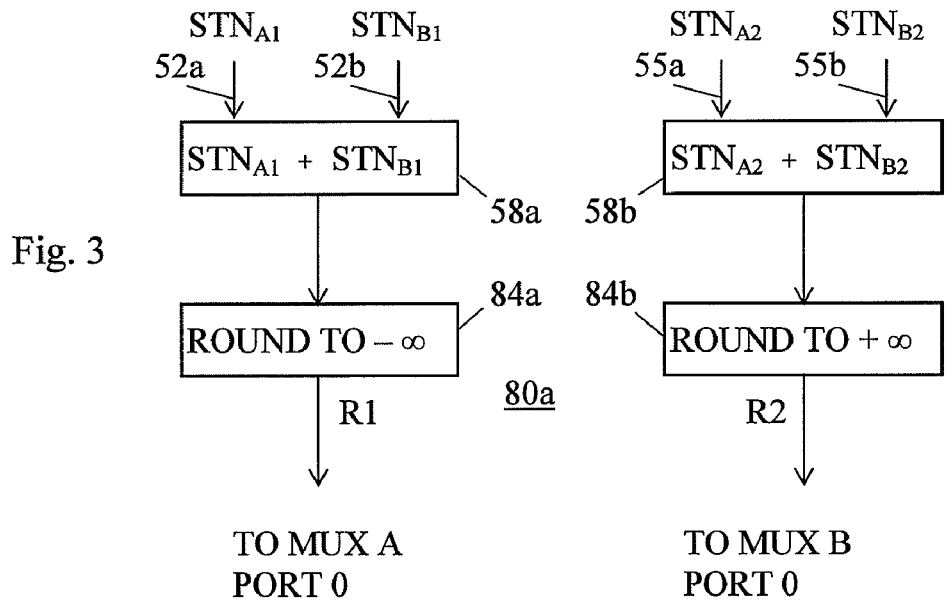

FIG. 3 shows as an example, the configuration of AFU$_0$ 80a as an addition unit requiring two MI operands. Adder 58a receives the STN$_{A1}$ and STN$_{B1}$ values in signals on paths 52a and 52b and produces a first preliminary result value STN$_{A1}$+STN$_{B1}$. Adder 58b receives the STN$_{A2}$ and STN$_{B2}$ values in signals on paths 55a and 55b and produces a second preliminary result value STN$_{A2}$+STN$_{B2}$.

Rounding element 84a rounds the first preliminary result value toward—∞. Rounding element 84b rounds the second preliminary result value toward +∞. The rounded MI result value R1 from rounding element 84a is then sent to port 0 input port 71a of multiplexer section A 68a. The rounded MI result value R2 from rounding element 84b is sent to port 0 input port 71b of multiplexer section B 68b.

Figure 4:
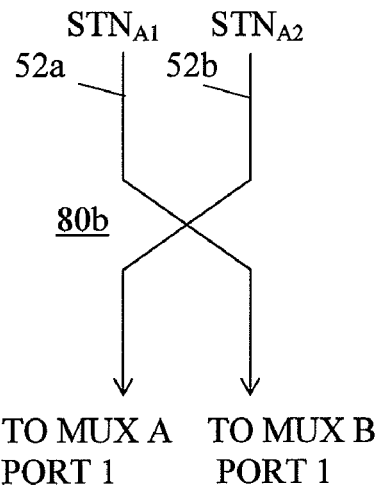
FIGS. 3 and 4 show two common mathematical functions that will likely be included in a commercial version of the logic circuit.

FIG. 4 is a very simple example of an AFU requiring only a single MI operand input to compute the dual function. The circuitry of FIG. 4 reverses the quantification value for operand A by reversing the position of STN$_{A1}$ and STN$_{B1}$ in result register 43. As is of course well known, most of the transcendental functions are similar, having only a single MI operand as input.

What is claimed is:

1. Hardware for computing first and second modal interval (MI) result values of at least first and second different MI functions responsive to respectively, first and second values of a selector signal, said computing based on at least one MI operand value encoded in an operand signal, each MI operand value comprising first and second multi-bit set theoretical numbers (STN) defining first and second end points of a range of real numbers, and further defining one of the universal and existential quantification values, comprising:
   a) at least first and second arithmetic functional units (AFUs) each connected to receive each operand signal, and performing an arithmetic operation using as the arguments therefor, the STNs defining each MI operand value encoded in each operand signal, and respectively providing the first and second MI result values in first and second result signals, an AFU of said at least first and second AFUs configured to selectively receive multi-bit set-theoretical numbers, designated STR$_{A1}$ and STN$_{A2}$, of a first MI operand value of said at least one MI operand value encoded in the operand signal, and multi-bit set-theoretical numbers, designated STN$_{B1}$ and STN$_{B2}$, of a second MI operand value of said at least one MI operand value encoded in the operand signal, wherein said AFU produces said first and second MI result values, designated R1 and R2 respectively, in said first and second result signals;
   b) a multiplexer having a selector input receiving the selector signal, having a multibit output port for providing an output signal encoding a MI result value, and having at least first and second multi-bit input ports, said first and second input ports connected to receive respectively the first and second result signals provided as the operand signals by the first and second AFUs, and each input port associated with a single selector signal value, said multiplexer supplying, encoded in an output signal provided by the output port, the MI result value provided at the input port thereof associated with the current selector signal value; and,
   c) a result register for storing each MI result value, and connected to receive and record the values respectively provided in the multiplexer output signal from the multiplexer output port.

2. The hardware of claim 1, wherein said AFU includes at least one rounding element for producing rounded MI result values of said first and second MI result values.

3. The hardware of claim 1, wherein said AFU includes a first rounding element to produce said first MI result value R1 rounded towards negative infinity and a second rounding element to produce said second MI result value R2 rounded towards positive infinity.

4. The hardware of claim 3, wherein said arithmetic operation is performed by said AFU to produce said MI result values R1 and R2, said arithmetic operation being selected from the group consisting of addition, subtraction, multiplication and division.

5. The hardware of claim 1, wherein said arithmetic operation is performed by said AFU to produce said MI result values R1 and R2, said arithmetic operation being selected from the group consisting of addition, subtraction, multiplication and division.

6. The hardware of claim 1, for computing at least one MI function based on first and second MI operands encoded in first and second operand signals, wherein said first AFU includes first and second arithmetic elements, each having first and second STN inputs, said first arithmetic element of said first AFU connected to receive said muti-bit set-theoretical number STN$_{A1}$ of said first MI operand value and said muti-bit set-theoretical number STN$_{B1}$ of said second MI operand value, said second arithmetic element of said first AFU connected to receive said muti-bit set-theoretical number STN$_{A2}$ of said first MI operand value and said muti-bit set-theoretical number STN$_{B2}$ of said second MI operand value, each arithmetic element of said first and second arithmetic elements encoding in the result signal an arithmetic function based on the STN values provided as inputs thereto.

7. The hardware of claim 6 wherein each of the first and second arithmetic elements of the first AFU comprises an adder forming the sum of the STN values provided to the inputs thereof.

8. The hardware of claim 6 wherein said first arithmetic element includes a rounding element rounding the sum of the STN values formed by the first arithmetic element toward negative infinity, and wherein said second arithmetic element includes a rounding element rounding the sum of the STN value formed by the second arithmetic element toward positive infinity.

9. The hardware of claim 6 wherein the first and second arithmetic elements each compute a MI value based on a standardized floating point format.

10. The hardware of claim 1 wherein an AFU of said at least first and second AFUs includes a structure for evaluating a MI relation selected from the group consisting of $<, \leq, \geq, >, \subseteq, \supset, =$ and, $\neq$.

11. The hardware of claim 1 wherein an AFU of said at least first and second AFUs includes a structure for executing a MI lattice operation selected from the group consisting of min, max, $\wedge$, and $\vee$.

12. The hardware of claim 1 wherein an AFU of said at least first and second AFUs includes a structure for executing a MI transcendental operation selected from the group consisting of sqrt, ln, exp, sin, cos, and tan.

13. The hardware of claim 1 wherein an AFU of said at least first and second AFUs includes a structure for executing a MI dual operation.

14. An integrated circuit for computing first and second modal interval (MI) result values of at least first and second different MI functions responsive to respectively, first and second values of a selector signal, said computing based on at least one MI operand value encoded in an operand signal, each MI operand value comprising first and second multi-bit set theoretical numbers (STN) defining first and second end points of a range of real numbers, and further defining one of the universal and existential quantification values, comprising:
  a) at least first and second arithmetic functional units (AFUs) each connected to receive each operand signal, and performing an arithmetic operation using as the arguments therefor, the STNs defining each MI operand value encoded in each operand signal, and respectively providing the first and second MI result values in first and second result signals, an AFU of said at least first and second AFUs configured to selectively receive multi-bit set-theoretical numbers, designated $STN_{A1}$ and $STN_{A2}$, of a first MI operand value of said at least one MI operand value encoded in the operand signal, and multi-bit set-theoretical numbers, designated $STN_{B1}$ and $STN_{B2}$, of a second MI operand value of said at least one MI operand value encoded in the operand signal, wherein said AFU produces said first and second MI result values, designated R1 and R2 respectively, in said first and second result signals;
  b) a multiplexer having a selector input receiving the selector signal, having a multibit output port for providing an output signal encoding a MI result value, and having at least first and second multi-bit input ports, said first and second input ports connected to receive respectively the first and second result signals provided as the operand signals by the first and second AFUs, and each input port associated with a single selector signal value, said multiplexer supplying, encoded in an output signal provided by the output port, the MI result value provided at the input port thereof associated with the current selector signal value; and,
  c) a result register for storing each MI result value, and connected to receive and record the values respectively provided in the multiplexer output signal from the multiplexer output port.

15. A coprocessor for computing first and second modal interval (MI) result values of at least first and second different MI functions responsive to respectively, first and second values of a selector signal, said computing based on at least one MI operand value encoded in an operand signal, each MI operand value comprising first and second multi-bit set theoretical numbers (STN) defining first and second end points of a range of real numbers, and further defining one of the universal and existential quantification values, comprising:
  a) at least first and second arithmetic functional units (AFUs) each connected to receive each operand signal, and performing an arithmetic operation using as the arguments therefor, the STNs defining each MI operand value encoded in each operand signal, and respectively providing the first and second MI result values in first and second result signals, an AFU of said at least first and second AFUs configured to selectively receive multi-bit set-theoretical numbers, designated $STN_{A1}$ and $STN_{A2}$, of a first MI operand value of said at least one MI operand value encoded in the operand signal, and multi-bit set-theoretical numbers, designated $STN_{B1}$ and $STN_{B2}$, of a second MI operand value of said at least one MI operand value encoded in the operand signal, wherein said AFU produces said first and second MI result values, designated R1 and R2 respectively, in said first and second result signals;
  b) a multiplexer having a selector input receiving the selector signal, having a multibit output port for providing an output signal encoding a MI result value, and having at least first and second multi-bit input ports, said first and second input ports connected to receive respectively the first and second result signals provided as the operand signals by the first and second AFUs, and each input port associated with a single selector signal value, said multiplexer supplying, encoded in an output signal provided by the output port, the MI result value provided at the input port thereof associated with the current selector signal value; and,
  c) a result register for storing each MI result value, and connected to receive and record the values respectively provided in the multiplexer output signal from the multiplexer output port.

* * * * *